(12) United States Patent
Howell et al.

(10) Patent No.: US 6,917,870 B2
(45) Date of Patent: Jul. 12, 2005

(54) INTERRUPT FOR AUTOMATIC TRACTION CONTROL VALVE FROM PARK BRAKE CIRCUIT

(75) Inventors: David W. Howell, Emmaus, PA (US); Charles E. Eberling, Wellington, OH (US); William P. Amato, Avon, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 0 days.

(21) Appl. No.: 10/604,753

(22) Filed: Aug. 14, 2003

(65) Prior Publication Data

US 2004/0098189 A1 May 20, 2004

Related U.S. Application Data

(60) Provisional application No. 60/403,684, filed on Aug. 15, 2002.

(51) Int. Cl.$^7$ ................................................. G06F 7/00
(52) U.S. Cl. ............................................ 701/82; 701/83
(58) Field of Search ............................... 701/70, 78, 82, 701/83; 303/1, 3, 28, 37, 40

(56) References Cited

U.S. PATENT DOCUMENTS

| | | | | |
|---|---|---|---|---|
| 5,190,357 A | * | 3/1993 | Goldfein | 303/7 |
| 5,613,744 A | * | 3/1997 | Eslinger et al. | 303/191 |
| 6,293,363 B1 | * | 9/2001 | Rangaswamy et al. | 180/287 |

* cited by examiner

*Primary Examiner*—Yonel Beaulieu
(74) *Attorney, Agent, or Firm*—Calfee, Halter & Griswold LLP

(57) ABSTRACT

An interrupt for an automatic traction control system includes a park brake control valve for controlling a park brake of a vehicle as a function of a park brake control pressure signal. A service brake control valve controls a service brake as a function of a service brake control pressure signal. A traction control valve communicates the service brake control pressure signal to the service brake control valve as a function of the park brake control pressure signal.

26 Claims, 5 Drawing Sheets

INTERRUPT FOR AUTOMATIC TRACTION CONTROL VALVE FROM PARK BRAKE CIRCUIT

CROSS REFERENCE TO RELATED APPLICATIONS

This application claims the benefit of U.S. Provisional Application No. 60/403,684, filed Aug. 15, 2002.

BACKGROUND OF INVENTION

The present invention relates to braking systems for large vehicles (e.g., trucks and buses). It finds particular application with antilock braking systems and automatic traction control systems used in conjunction with air-braked systems and will be described with particular reference thereto. It will be appreciated, however, that the invention is also amenable to other like applications.

It has become common for vehicles (e.g., commercial air-braked vehicles) to include an antilock braking system (ABS) and automatic traction control (ATC). These vehicles typically include wheel speed sensors, which generate signals for activating the ATC. It has been noticed, however, that under certain conditions, false sensor signals may cause the ATC to activate while the vehicle is parked. Activation of the ATC can override the park brake via anti-compounding plumbing or circuitry. Anti-compounding is a feature of air brake systems which avoids applying the spring actuated park brake and the air actuated service brakes at the same time. More specifically, activation of the ATC may, in turn, cause the park brake to be released, which may cause the vehicle to move (e.g., roll) unexpectedly. Such an event is undesirable if the vehicle is intended to be parked.

False sensor signals, which activate the ATC, may be caused from a variety of sources. For example, since wheel speed sensors are typically mounted on or near the vehicle wheels, vibrations transmitted through the tires are also transmitted to the wheels and, furthermore, to the wheel speed sensors. In this case, the wheel speed sensor may interpret the false signals as wheel movement. More specifically, the false signals may mimic those signals produced by the wheel when the vehicle is moving (and the wheel is rotating).

If an ATC control unit receives a signal from a wheel speed sensor that a drive wheel is moving and determines that the vehicle is stationary, the ATC control unit may determine that the wheel is slipping on, for example, ice. Therefore, the ATC control unit may activate an ATC process to compensate for the "slipping" wheel. More specifically, the ATC process may begin controlling the brake associated with the slipping wheel. Consequently, the ATC processor may cause the vehicle park brakes to be released via typical anti-compounding.

In one prior art system, a park brake status is communicated over a CAN-bus (e.g., J1939) to the ATC control unit for disabling the ATC. One drawback to this system is that it requires a CAN-bus and a processing unit including software for interpreting the park brake status signal communicated over the CAN-bus. Furthermore, such a system requires a communications link between the processing unit and the ATC control unit for disabling/enabling the ATC. The processing unit and software for interpreting the park brake status signal are not available on all vehicles.

The present invention provides a new and improved apparatus and method which addresses the above-referenced problems.

SUMMARY

In one embodiment, an interrupt for an automatic traction control system includes a park brake control valve for controlling a park brake of a vehicle as a function of a park brake control pressure signal. A service brake control valve controls a service brake as a function of a service brake control pressure signal. A traction control valve communicates the service brake control pressure signal to the service brake control valve as a function of the park brake control pressure signal.

In one aspect, the park brake control pressure signal is communicated as the service brake control pressure signal when a traction event occurs.

In one aspect, the park brake is engaged when the park brake control pressure signal is less than an engage pressure level. Also, the park brake is released when the park brake control pressure signal is greater than a release pressure level.

In another aspect, an electronic control unit transmits an electronic control signal to the traction control valve as a function of whether the traction event is occurring. The park brake control pressure signal is communicated as the service brake control pressure signal as a function of the electronic control signal.

In another aspect, a wheel speed sensor communicates a speed of a wheel to the electronic control unit. The electronic control unit determines whether the traction event is occurring as a function of the wheel speed.

In another aspect, the traction control valve includes a solenoid. The traction control valve communicates the park brake control pressure signal to the service brake control valve as a function of a position of the solenoid. Also, the solenoid is positioned as a function of the electronic control signal.

In another aspect, a pressure switch communicates with the park brake control pressure signal. A electrical switch, set as a function of the first pressure switch, electrically communicates with the electronic control unit. A status of the electronic control unit is controlled via an electronic control signal transmitted from the electrical switch.

In another aspect, a pressure switch communicates with the park brake control pressure signal. A electrical switch, set as a function of the pressure switch, electrically communicates with the electronic control unit and the traction control valve. The electronic control signal is transmitted from the electronic control unit to the traction control valve when the switch is closed.

In another aspect, an electronic control signal, which is substantially equivalent to an electronic signal transmitted to the traction control valve when the traction event is not occurring, is sensed by the electronic control unit when the switch is open.

In another aspect, a pressure switch communicates with the park brake control pressure signal. An electrical switch, set as a function of the pressure switch, electrically communicates with the electronic control unit and a stop lamp. A status of the electronic control unit is controlled via an electronic control signal transmitted from the electrical switch.

In another aspect, a pressure protection valve communicates with the traction control valve and the park brake control valve. A check valve exhausts pressurized air from the traction control valve. The pressure protection valve opens when the park brake control pressure signal is above a predetermined level for communicating the park brake control pressure signal to the traction control valve. The pressure protection valve closes when the park brake control pressure signal is below a predetermined level. Also, pressurized air between the pressure protection valve and the traction control valve is exhausted via the check valve when the pressure protection valve is closed.

In another aspect, the park brake control valve is a spring relay valve.

In another aspect, the park brake control valve is a quick release valve.

In another embodiment, a traction control valve includes a first pressure input port communicating with a park brake control pressure signal, a second pressure input port communicating with an operator controlled pressure output, and an pressure output port communicating one of the first and second pressure input ports as a function of an operating state.

In another embodiment, a method for interrupting an automatic traction control system includes controlling a park brake of a vehicle as a function of a park brake control pressure signal applied to a park brake control valve. A service brake is controlled as a function of a service brake control pressure signal applied to a service brake control valve. The service brake control pressure signal is communicated from a traction control valve to the service brake control valve. The park brake control pressure signal is communicated as the service brake control pressure signal when a traction event occurs.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
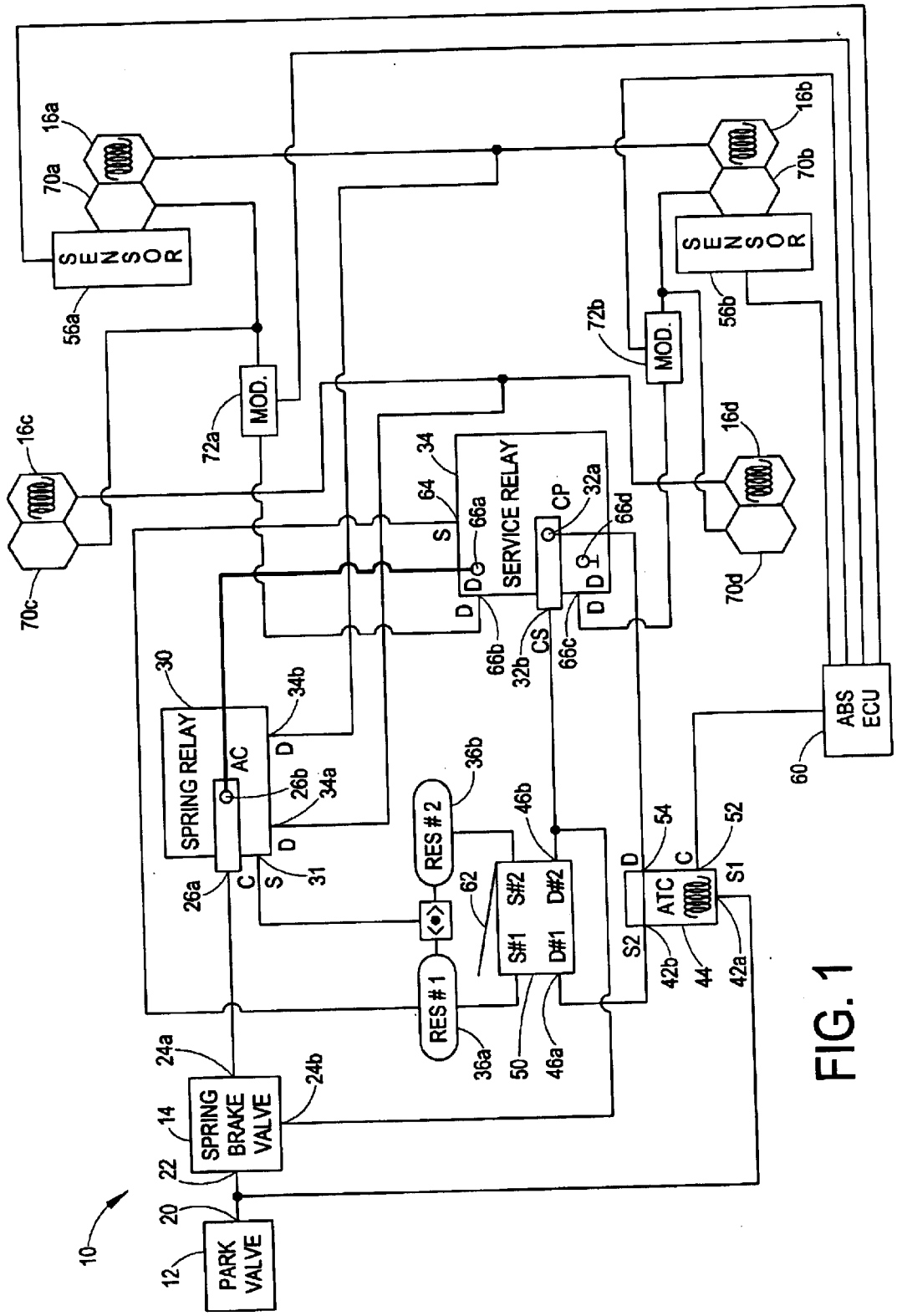
FIG. 1 illustrates a braking system in accordance with one embodiment of the present invention.
Figure 2:
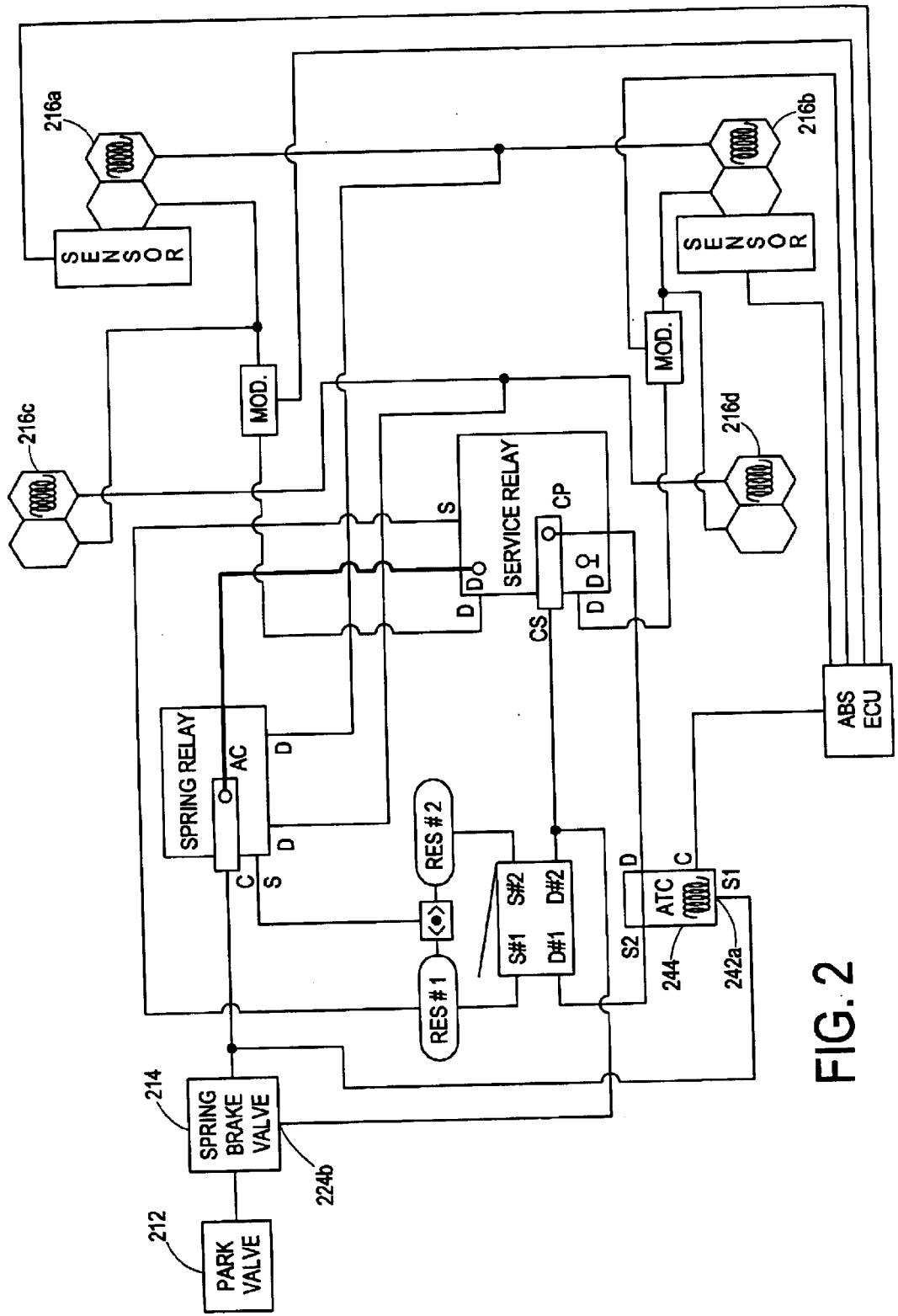
FIG. 2 illustrates a braking system in accordance with a second embodiment of the present invention.
Figure 3:
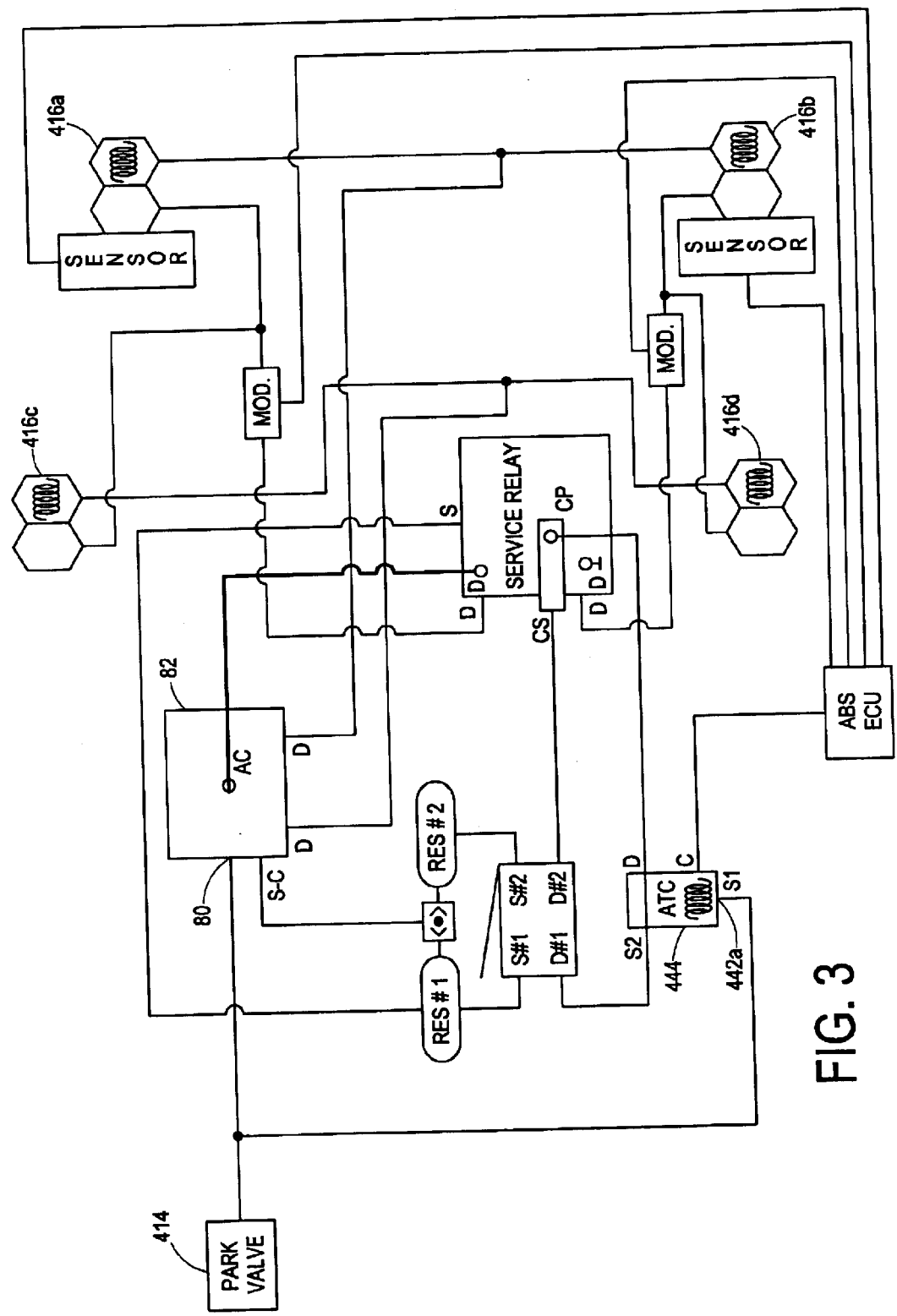
FIG. 3 illustrates a braking system in accordance with a third embodiment of the present invention.
Figure 4:
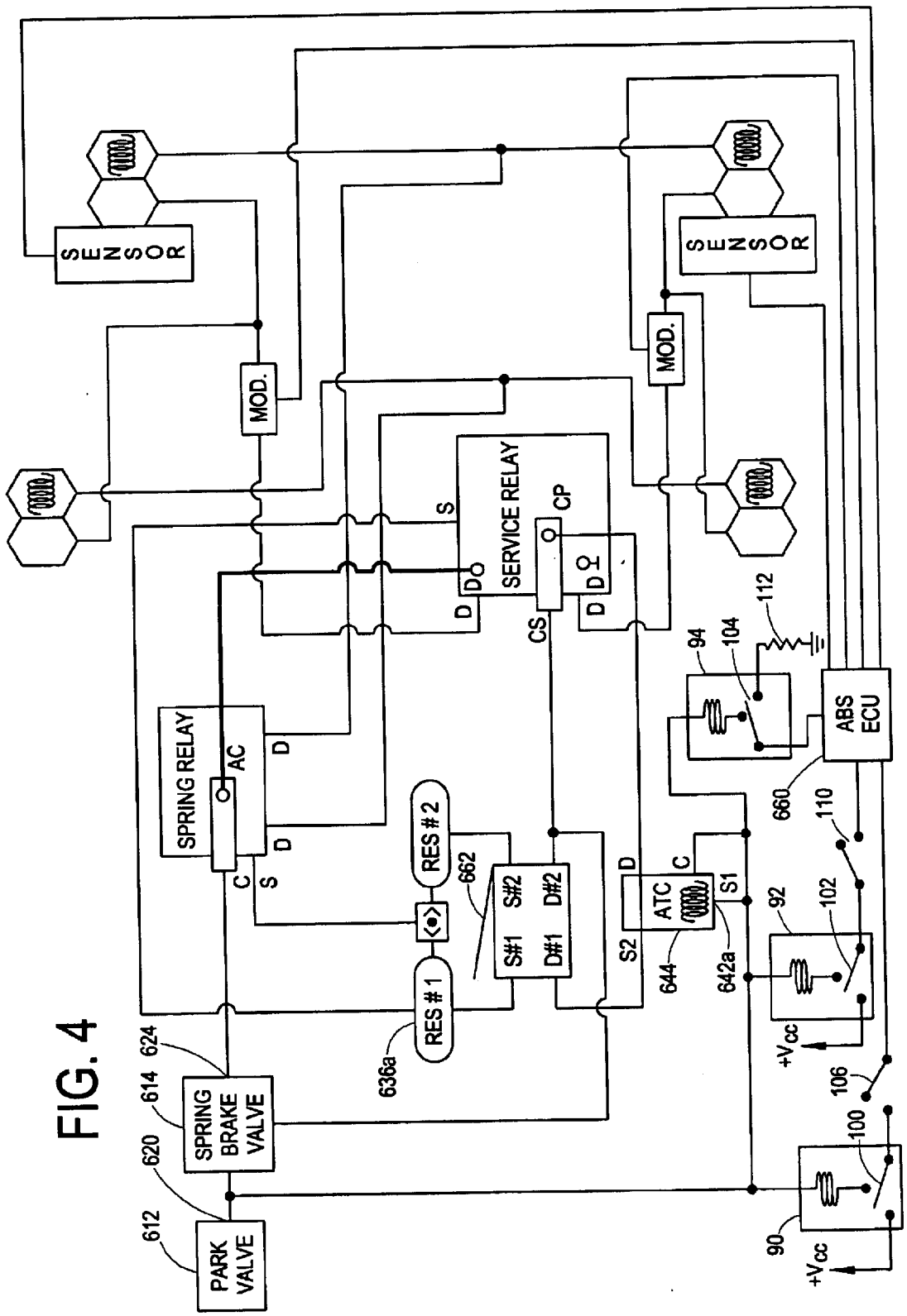
FIG. 4 illustrates a braking system in accordance with a fourth embodiment of the present invention.
Figure 5:
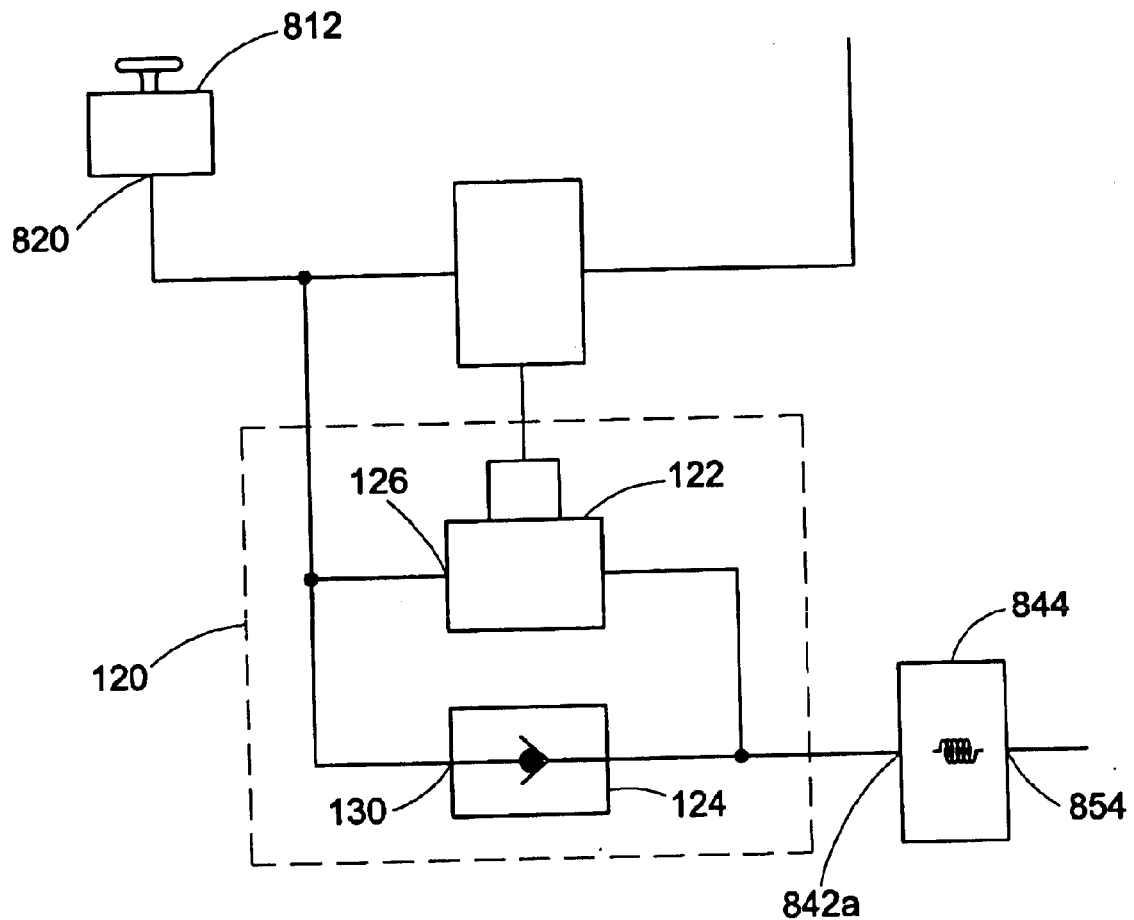
FIG. 5 illustrates a braking system in accordance with a fifth embodiment of the present invention.

With reference to FIGURE, a braking system 10 for a vehicle includes a park brake control valve 12 (park valve) and a spring brake valve 14. In one embodiment, the park valve 12 is an operator controlled dash control valve integrated with a dashboard of a vehicle; also, the spring brake valve 14 supplies a specific, limited hold-off pressure to spring brakes 16a, 16b, 16c, 16d. Although it is not illustrated in the figures, it is to be understood that the park valve 12 communicates with one or more sources of air pressure and spring brake valve 14 may communicate with other inputs.

The park valve 12 includes a push-pull control valve (not shown) for controlling the spring brakes (e.g., park brakes) 16a, 16b, 16c, 16d of a vehicle. The push-pull control valve is selectively set by an operator of the vehicle for controlling the application and release of the spring brakes 16a, 16b, 16c, 16d. According to commonly accepted practice, an output port 20 of the park valve 12 supplies air pressure to an input port 22 of the spring brake valve 14 for releasing the spring brakes 16a, 16b, 16c, 16d; conversely, the output port 20 of the park valve 12 exhausts air pressure from the input port 22 of the spring brake valve 14 for engaging the spring brakes 16a, 16b, 16c, 16d. In other words, the park brakes 16a, 16b, 16c, 16d are controlled as a function of a park brake control pressure signal, which is produced by the park valve 12. Although it is contemplated in one embodiment that the park valve 12 is an MVDash Control Module and the spring brake valve 14 is an SRSpring Brake Valve, which are represented by Bendix Commercial Vehicle Systems LLC part numbers 5004463 and 286834, respectively, it is to be understood that other parts having similar function and/or operation are also contemplated. It is also contemplated that two or more of the discreet devices shown, for example the spring brake valve 14 and spring relay 30, could be combined into a single device performing essentially the same function.

An output port 24 of the spring brake valve 14 communicates with a first control port 26a of a spring relay valve 30. The spring relay valve 14 functions as a relay station for speeding up the application and release of the spring brakes 16a, 16b, 16c, 16d. In addition to the control port 26a, the spring relay valve 30 also includes a second control port 26b, a supply port 31, and delivery ports 34a, 34b. The supply port 31 receives pressurized air from a plurality of air reservoir tanks 36a, 36b (e.g., two (2)) via a double check valve 40. The reservoir tanks 36a, 36b receive pressurized air from a compressor (not shown).

An operator causes the park brakes 16a, 16b, 16c, 16d to be released via the park valve 12. More specifically, the operator moves the push-pull control valve on the park valve 12 to a position for causing air pressure to build above a spring brake release pressure at the output port 20. The air pressure at the output port 20 (e.g., the park brake control pressure signal) is communicated to the input port 22 of the spring brake valve 14 and a first supply port 42a of a traction control valve 44. The traction control valve 44 also includes a second input port 42b, which communicates with a first delivery port 46a of an operator controlled pressure valve 50 (e.g., a treadle valve). In one embodiment, the traction control valve 44 includes a solenoid, which is selectively set to a plurality of positions (e.g., two (2)) as a function of an electrical signal (electronic control signal) received at a control port 52 from an external control unit (see ECU 60 discussed below). In one position, the solenoid is set so that the first supply port 42a communicates with a delivery port 54; in a second position, the solenoid is set so that the second supply port 42b communicates with the delivery port 54.

When pressure above a predetermined level is present at the input port 22 of the spring brake valve 14, the spring brake valve 14 communicates a specific, limited hold-off pressure to the spring brakes 16a, 16b, 16c, 16d via the spring relay valve 30. More specifically, the specific, limited hold-off pressure is communicated from the output port 24 of the spring brake valve 14 to the first control port 26a of the spring relay valve 30. The pressure at the delivery ports 34a, 34b is a function of the pressure at the first control port 26a. The pressure at the delivery ports 34a, 34b of the spring relay valve 30 is communicated to the spring brakes 16a, 16b, 16c, 16d. Consequently, the spring brakes 16a, 16b, 16c, 16d are released.

Sensors 56a, 56b monitor the rotational speeds of respective wheels (not shown). The sensors 56a, 56b transmit electronic signals, which represent the respective wheel speeds, to an electronic control unit (ECU) 60. In one embodiment, the ECU 60 is an antilock brake system/ automatic traction control (ABS/ATC) unit. However, other types of ECUs are also contemplated. The ECU 60 interprets the signals from the sensors and determines whether a traction event is occurring. In other words, a status of the ECU 60 is set as a function of the traction event. A traction event occurs, for example, when a difference between the rotational rates of the wheels is greater than a predetermined amount. However, as discussed above, the ECU 60 may incorrectly determine that a traction event is occurring when, for example, one or both of the sensors 56a, 56b receives vibrations.

When a traction event is not occurring (e.g., during normal operation), the ECU 60 transmits a corresponding electrical signal to the control port 52 of the traction control valve 44 for causing the second input port 42b to communicate with the output port 54. Alternatively, it is also contemplated that the ECU 60 only transmits an electrical signal to the control port 52 during a traction event and, furthermore, that the ECU 60 does not transmit any electrical signal to the control port 52 during normal operation. In the state when a traction event is not occurring (e.g., during normal operation), pressure is applied from the first delivery port 46a of the treadle control valve 50 to the first control port 32a of the service relay 34 via the traction control valve 44. When service brake control pressure signals at either the first input port 32a or a second input port 32b of the service relay 34 is above a predetermined level, the service relay 34 delivers pressure from a supply port 64 to delivery ports 66a, 66b, 66c, 66d for delivering pressure to the service brakes 70a, 70b, 70c, 70d via modulators 72a, 72b. Therefore, the service brakes are controlled as a function of the service brake control pressure signal.

When the ECU 60 determines a traction event is occurring, the ECU 60 transmits a corresponding electrical signal to the control port 52 of the traction control valve 44 for causing the first input port 42a to communicate with the output port 54. As discussed above, an air pressure is present at the first input port 42a only if the parking brakes are in a released state. Therefore, the pressure at 42a is transmitted to the output port 54 and the first control port 32a of the service relay valve 34 during a traction event. The pressure at the first control port 32a causes the service relay valve 34 to deliver pressure to the service brakes 70a, 70b, 70c, 70d via the modulators 72a, 72b. The ECU 60 causes the modulators 72a, 72b to modulate the air delivered to the service brakes 70a, 70b, 70c, 70d during the traction event.

Alternatively if the parking brakes 16a, 16b, 16c, 16d are engaged during a traction event, no pressure is present at the first input port 42a of the traction control valve 44. Therefore, even though the ECU 60 causes the first control port 42a of the traction control valve 44 to communicate with the delivery port 54, no pressure is present at the delivery port 54 to be transmitted to the first control port 32a of the service relay valve 34. Consequently, no pressure is delivered to the modulators 72a, 72b or the service brakes 70a, 70b, 70c, 70d. Furthermore, no pressure is present at the output port 66a of the service relay valve 34, which communicates with the second control port 26b of the spring relay valve 30 to prevent compounding. Because no pressure is present at the first input port 42a of the traction control valve 44 when the park brakes 16a, 16b, 16c, 16d are engaged, a traction event does not cause the park brakes 16a, 16b, 16c, 16d to be released.

As described above, the park valve 12 and the traction control valve 44 act together to interrupt a traction event when the park brakes are engaged.

FIGURE illustrates a second embodiment of the present invention. For ease of understanding this embodiment of the present invention, like components are designated by like numerals incremented by 200. Therefore, the park valve of FIGURE is referenced as 212.

With reference to FIGURE, the first input port 242a of the traction control valve 244 communicates with the output port 224 of the spring brake valve 214. Therefore, as in FIGURE, an air pressure below the predetermined engage level is present at the first input port 242a when the park brakes 216a, 216b, 216c, 216d are engaged. Furthermore, an air pressure above the predetermined release level is present at the first input port 242a when the park brakes 216a, 216b, 216c, 216d are released. The operation of the embodiment illustrated in FIGURE is similar to the operation of the embodiment illustrated in FIGURE.

FIGURE illustrates a third embodiment of the present invention. For ease of understanding this embodiment of the present invention, like components are designated by like numerals incremented by 400 with respect to the embodiment illustrated in FIGURE while new components are assigned new reference numerals.

With reference to FIGURE, the output of the park valve 414 communicates with the input port 442a of the traction control valve 444 and an input port 80 of a quick release valve 82. In the embodiment illustrated in FIGURE, it is contemplated to use a QRQuick Release Valve, which is represented by Bendix Commercial Vehicle Systems LLC part number 289714. However, other types of quick release valves are also contemplated. As in FIGURE, an air pressure below the predetermined engage level is present at the first input port 442a when the park brakes 416a, 416b, 416c, 416d are engaged. Furthermore, an air pressure above the predetermined release level is present at the first input port 442a when the park brakes 416a, 416b, 416c, 416d are released. The operation of the embodiment illustrated in FIGURE is similar to the operation of the embodiment illustrated in FIGURE.

FIGURE illustrates a fourth embodiment of the present invention. For ease of understanding this embodiment of the present invention, like components are designated by like numerals incremented by 600 with respect to the embodiment illustrated in FIGURE while new components are assigned new reference numerals.

With reference to FIGURE, first, second, and third pressure switches 90, 92, 94, respectively, communicate with the air pressure at the output port 620 of the park valve 612. First, second, and third electrical switches 100, 102, 104 are controlled as a function of the pressure switches 90, 92, 94, respectively. In the illustrated embodiment, the electrical switches 100, 102, 104 are incorporated into the pressure switches 90, 92, 94; however, it is to be understood that other embodiments including other arrangements of pressure switches 90, 92, 94 and electrical switches 100, 102, 104 are also contemplated. A fourth electrical switch 106 is referred to as an automatic traction control disable switch and is controlled by the vehicle operator. A fifth electrical switch 110 is open when a stop lamp is illuminated (e.g., when the pedal 662 is pushed by the operator) and closed when the stop lamp is not illuminated or vice versa. Furthermore, the first supply port 642a communicates with the reservoir 636a instead of the output port 620.

When the pressure at the park valve 612 is above the predetermined release level, the first pressure switch 90 causes the first electrical switch 100 to close and connect a power source (Vcc) to the ECU 660 if the fourth electrical switch 106 is normally closed by the operator. Otherwise, if the pressure at the output port 620 of the park valve 612 is below the predetermined engage level, the first pressure switch 90 causes the first electrical switch 100 to open, thereby disabling the ECU 660. Consequently, a signal indicating that a traction event is occurring cannot be transmitted to the traction control valve 644. It is to be understood that other embodiments, including other arrangements of a automatic traction control disable switch and a pressure switch, which is controlled by pressure in the park brake system, are contemplated.

Alternatively, if the pressure at the output port 620 of the park valve 612 is above the predetermined release level, the second pressure switch 92 causes the second electrical switch 102 to close and connect the power source (Vcc) to the ECU 660 if the stop lamp is not illuminated (i.e., if the fifth electrical switch 110 is closed). Consequently, a signal indicating that a traction event is occurring may be transmitted to the traction control valve 644. Otherwise, if the pressure at the output port 620 of the park valve 612 is below the predetermined engage level, the second pressure switch 92 causes the second electrical switch 102 to open and disconnect the power source (Vcc) from the ECU 660 regardless of whether the stop lamp is illuminated. In this state, a signal indicating that a traction event is occurring cannot be transmitted to the traction control valve 644. It is to be understood that other embodiments, including other arrangements of a stop lamp switch and a pressure switch, which is controlled by pressure in the park brake system, are contemplated.

Alternatively, if the pressure at the output port 620 of the park valve 612 is above the predetermined release level, the third pressure switch 94 causes the third electrical switch 104 to close, thereby allowing electrical control signals to be transmitted from the ECU 660 to the traction control valve 644 during a traction event. Otherwise, if the pressure at the output port 620 of the park valve 612 is below the predetermined engage level, the third pressure switch 94 causes the third electrical switch 104 to open, thereby preventing electrical control signals from being transmitted from the ECU 660 to the traction control valve 644. In this state, it is also contemplated to have the third electrical switch 104 electrically connected to an equivalent resistance 112 sensed by the ECU 660 to avoid any faults from occurring in the ECU 660 from an open circuit. The equivalent resistance is substantially equal to a resistance sensed by the ECU 660 from the traction control valve 644. It is to be understood that other embodiments, including other arrangements of a traction control valve and a pressure switch, which is controlled by pressure in the park brake system, are contemplated.

It is to be understood that although the pressure switches 90, 92, 94 are illustrated in FIGURE as being connected to the output port 620 of the park valve 612, it is to be understood that the switches 90, 92, 94 may, in other embodiments, be connected to the output port 624 of the spring brake valve 614 or to the input port 642a of the traction control valve 644.

FIGURE illustrates a fifth embodiment of the present invention. For ease of understanding this embodiment of the present invention, like components are designated by like numerals incremented by 800 with respect to the embodiment illustrated in FIGURE while new components are assigned new reference numerals.

With reference to FIGURE, the output port 820 of the park valve 812 communicates with a valve 120, which includes a protection valve 122 (e.g., a pressure protection valve) and a check valve 124 (e.g., a one-way check valve). More specifically, the output port 820 communicates with an input port 126 of the protection valve 122 and an output port 130 of the check valve 124. When the vehicle operator sets the park valve 812 to release the park brakes, pressure above the predetermined release level is present at the input port 126 of the protection valve 122, thereby causing the protection valve 122 to open. When the protection valve 122 is open, air pressure flows freely to the first input port 842a of the traction control valve 844. Therefore, as discussed above with reference to FIGURE, pressure is present at the output port 854 of the traction control valve 844 during a traction event.

When the vehicle operator sets the park valve 812 to engage the park brakes, pressure below the predetermined engage level is present at the input port 126 of the protection valve 122, thereby causing the protection valve 122 to close. When the protection valve 122 is closed, air pressure at the first input port 842a is exhausted via the check valve 124. Therefore, as discussed above with reference to FIGURE, no pressure is present at the output port 854 when the park brake is engaged.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. An interrupt for an automatic traction control system, comprising:
    a park brake control valve for controlling a park brake of a vehicle as a function of a park brake control pressure signal;
    a service brake control valve for controlling a service brake as a function of a service brake control pressure signal; and
    a traction control valve communicating the service brake control pressure signal to the service brake control valve as a function of the park brake control pressure signal.

2. The interrupt as set forth in claim 1, wherein the park brake control pressure signal is communicated as the service brake control pressure signal when a traction event occurs.

3. The interrupt as set forth in claim 1, wherein:
    the park brake is engaged when the park brake control pressure signal is less than an engage pressure level; and
    the park brake is released when the park brake control pressure signal is greater than a release pressure level.

4. The interrupt as set forth in claim 1, further including:
    an electronic control unit transmitting an electronic control signal to the traction control valve as a function of whether a traction event is occurring, the park brake control pressure signal being communicated as the service brake control pressure signal as a function of the electronic control signal.

5. The interrupt as set forth in claim 4, further including:
    a wheel speed sensor communicating a speed of a wheel to the electronic control unit, the electronic control unit determining whether the traction event is occurring as a function of the wheel speed.

6. The interrupt as set forth in claim 4, wherein:

the traction control valve includes a solenoid;

the traction control valve communicates the park brake control pressure signal to the service brake control valve as a function of a position of the solenoid; and the solenoid is positioned as a function of the electronic control signal.

7. The interrupt as set forth in claim 4, further including:

a pressure switch communicating with the park brake control pressure signal; and an electrical switch, set, as a function of the pressure switch, electrically communicating with the electronic control unit, a status of the electronic control unit being controlled via an electronic control signal transmitted from the electrical switch.

8. The interrupt as set forth in claim 4, further including:

a pressure switch communicating with the park brake control pressure signal; and a electrical switch, set as a function of the pressure switch, electrically communicating with the electronic control unit and the traction control valve, the electronic control signal being transmitted from the electronic control unit to the traction control valve when the switch is closed.

9. The interrupt as set forth in claim 8, wherein an electronic control signal, which is substantially equivalent to an electronic signal transmitted to the traction control valve when the traction event is not occurring, is sensed by the electronic control unit when the switch is open.

10. The interrupt as set forth in claim 4, further including:

a pressure switch communicating with the park brake control pressure signal; and an electrical switch, set as a function of the pressure switch, electrically communicating with an electronic control unit and a stop lamp, a status of the electronic control unit being controlled via an electronic control signal transmitted from the electrical switch.

11. The interrupt as set forth in claim 1, further including:

a pressure protection valve communicating with the traction control valve and the park brake control valve;

a check valve exhausting pressurized air from the traction control valve;

wherein the pressure protection valve opens when the park brake control pressure signal is above a predetermined level for communicating the park brake control pressure signal to the traction control valve;

wherein the pressure protection valve closes when the park brake control pressure signal is below a predetermined level; and wherein pressurized air between the pressure protection valve and the traction control valve is exhausted via the check valve when the pressure protection valve is closed.

12. The interrupt as set forth in claim 1, wherein the park brake control valve is a spring relay valve.

13. The interrupt as set forth in claim 1, wherein the park brake control valve is a quick release valve.

14. A traction control valve, comprising:

a first pressure input port communicating with a park brake control pressure signal;

a second pressure input port communicating with an operator controlled pressure output;

a control port receiving a control signal from an external control unit as a function of an occurrence of a traction event; and a pressure output port communicating with one of the first and second pressure input ports as a function of the control signal.

15. The traction control valve as set forth in claim 14, wherein the operator controlled pressure output is a treadle valve.

16. The traction control valve as set forth in claim 14, wherein:

the pressure output port communicates with the first pressure input port when the traction event is occurring; and the pressure output port communicates with the second pressure input port when the traction event is not occurring.

17. The traction control valve as set forth in claim 14, wherein the control signal is an electronic signal.

18. The traction control valve as set forth in claim 14, further including:

wherein the external control unit is electrically controlled as a function of the park brake control pressure signal.

19. The traction control valve as set forth in claim 14, further including:

a solenoid being selectively set to one of a plurality of positions, the pressure output port communicating with one of the first and second pressure input ports as a function of the position of the solenoid.

20. A method for interrupting an automatic traction control system, comprising:

controlling a park brake of a vehicle as a function of a park brake control pressure signal applied to a park brake control valve;

controlling a service brake as a function of a service brake control pressure signal applied to a service brake control valve;

communicating the service brake control pressure signal from a traction control valve to the service brake control valve; and interrupting the traction control system during a traction event as a function of the park brake control signal.

21. The method for interrupting an automatic traction control system as set forth in claim 20, wherein the interrupting includes:

communicating the park brake control pressure signal as the service brake control pressure signal, the traction event being interrupted if the park brake control pressure signal is below a predetermined level.

22. The method for interrupting an automatic traction control system as set forth in claim 20, wherein the interrupting includes:

if the park brake control pressure signal is below a predetermined level, opening an electrical switch between the traction control valve and an electronic control unit for preventing an automatic traction control signal from being transmitted from the electronic control unit to the traction control unit.

23. The method for interrupting an automatic traction control system as set forth in claim 22, further including:

if the electrical switch is open, receiving a signal in the electronic control unit that is substantially equivalent to an electronic signal transmitted from the traction control valve when the traction event is not occurring.

24. The method for interrupting an automatic traction control system as set forth in claim 20, wherein the traction control valve includes a solenoid selectively set between a plurality of positions, the method further including:

when the traction event is occurring, setting the solenoid to a traction position for communicating the park brake control pressure signal from the traction control valve to the service brake control valve; and when the traction event is not occurring, setting the solenoid to a non-traction position for communicating an operator controlled pressure signal from the traction control valve to the service brake control valve.

25. The method for interrupting an automatic traction control system as set forth in claim 20, further including, during the traction event:

opening a pressure protection valve; and communicating the park brake control pressure signal from the traction control valve to the service brake control valve via the pressure protection valve.

26. The method for interrupting an automatic traction control system as set forth in claim 25, further including, when the traction event is not occurring:

closing the pressure protection valve; and exhausting pressure between the traction control valve and the pressure protection valve via a check valve.

\* \* \* \* \*